(12) United States Patent
Bradbury et al.

(10) Patent No.: US 7,468,991 B2
(45) Date of Patent: Dec. 23, 2008

(54) METHODS AND DEVICES FOR SYNCHRONIZING THE TIMING OF LOGIC CARDS IN A PACKET SWITCHING SYSTEM WITHOUT DATA LOSS

(75) Inventors: Frank Bradbury, Saugus, MA (US); John Patrick Jones, Westford, MA (US); Douglas MacIntyre, Berlin, MA (US); Raymond Schmidt, Stoughton, MA (US); Scott Whitney, Chelmsford, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1069 days.

(21) Appl. No.: 10/388,438

(22) Filed: Mar. 17, 2003

(65) Prior Publication Data

US 2004/0184485 A1 Sep. 23, 2004

(51) Int. Cl.
*H04J 3/06* (2006.01)

(52) U.S. Cl. ...................................... 370/503; 375/357

(58) Field of Classification Search ................ 370/503, 370/507, 509, 510, 512, 513, 514, 520, 281, 370/302, 516; 375/357, 355, 354, 240.28, 375/293, 294, 376, 240, 28
See application file for complete search history.

(56) References Cited

U.S. PATENT DOCUMENTS

| | | | | |
|---|---|---|---|---|
| 3,992,679 A | * | 11/1976 | Isono | 331/17 |
| 4,725,786 A | * | 2/1988 | Papaieck | 327/105 |
| 5,077,734 A | * | 12/1991 | Ohtsuka | 370/509 |
| 5,654,815 A | * | 8/1997 | Bunse | 398/154 |
| 6,151,367 A | * | 11/2000 | Lim | 375/326 |
| 6,476,652 B1 | * | 11/2002 | Lee et al. | 327/158 |
| 6,747,998 B1 | * | 6/2004 | Enari | 370/516 |
| 6,760,346 B1 | * | 7/2004 | Suemura et al. | 370/504 |

* cited by examiner

*Primary Examiner*—Chi H Pham
*Assistant Examiner*—Alexander Boakye

(57) ABSTRACT

Synchronous timing techniques provide redundant reference frequencies to enable a packet switching system to continuously generate one or more master clock frequencies when an original reference frequency is lost or unavailable.

11 Claims, 2 Drawing Sheets

METHODS AND DEVICES FOR SYNCHRONIZING THE TIMING OF LOGIC CARDS IN A PACKET SWITCHING SYSTEM WITHOUT DATA LOSS

BACKGROUND OF THE INVENTION

The backbone of many telecommunication networks is based on "packet switching systems". Such systems comprise a large number of components referred to as "logic cards". Logic cards control the flow of data "packets" through a network. It is essential that all logic cards within the same system be synchronized to one another. If they are not, packets may be lost leading to a resulting loss in data and information.

To ensure that this does not occur, logic cards within one packet switching system are designed to operate using the same timing frequency, e.g., 200 MHz. Because this frequency is central to the operation of an entire system it is referred to as a "master clock" frequency. Presently, this master clock frequency is itself derived from a "reference clock" frequency (e.g., 25 MHz). This reference frequency is generated by a so-called "clock card".

During the lifetime of a packet switching system there will be a need to carry out maintenance or upgrades to the system, including to the clock card. In addition, clock cards sometimes fail. In either case, the result is that the clock card must be taken out of service.

It is essential that when a clock card is taken out of service that the logic cards are still fed a reference frequency (i.e., the 25 MHz signal mentioned above). If the logic cards do not receive the appropriate reference frequency, they will not be able to generate their own 200 MHz master clock frequencies. This in turn leads to an increased risk that packets of information or data will be lost. This scenario must be prevented at all costs.

One way of preventing such loss of data is to use two different clock cards. The thought behind this design is that when one clock card fails, or needs maintenance, it is disconnected from the logic cards and a second logic card is connected.

However, even though both clock cards are ideally designed to generate the same frequency, problems arise in making sure that the two reference frequencies stay within substantially the same frequency range and remain in phase (i.e., maintain the same timing) with one another over time.

Accordingly, it is desirable to provide techniques to ensure the proper synchronization of logic cards within a packet switching system when one or more clock cards are taken out of service.

Further desires of the present invention will become apparent from the drawings, detailed description of the invention and claims which follow.

SUMMARY OF THE INVENTION

In accordance with the present invention there are provided techniques for ensuring the proper synchronization of logic cards within a packet switching system. One such technique comprises a synchronous timing circuit which includes two redundant clock circuits, each adapted to generate a reference frequency based on one of two oscillation signals.

The availability of two oscillation signals ensures that one will always be available if the other is lost or becomes unavailable (e.g., taken out of service).

DETAILED DESCRIPTION OF THE INVENTION

Figure 1:
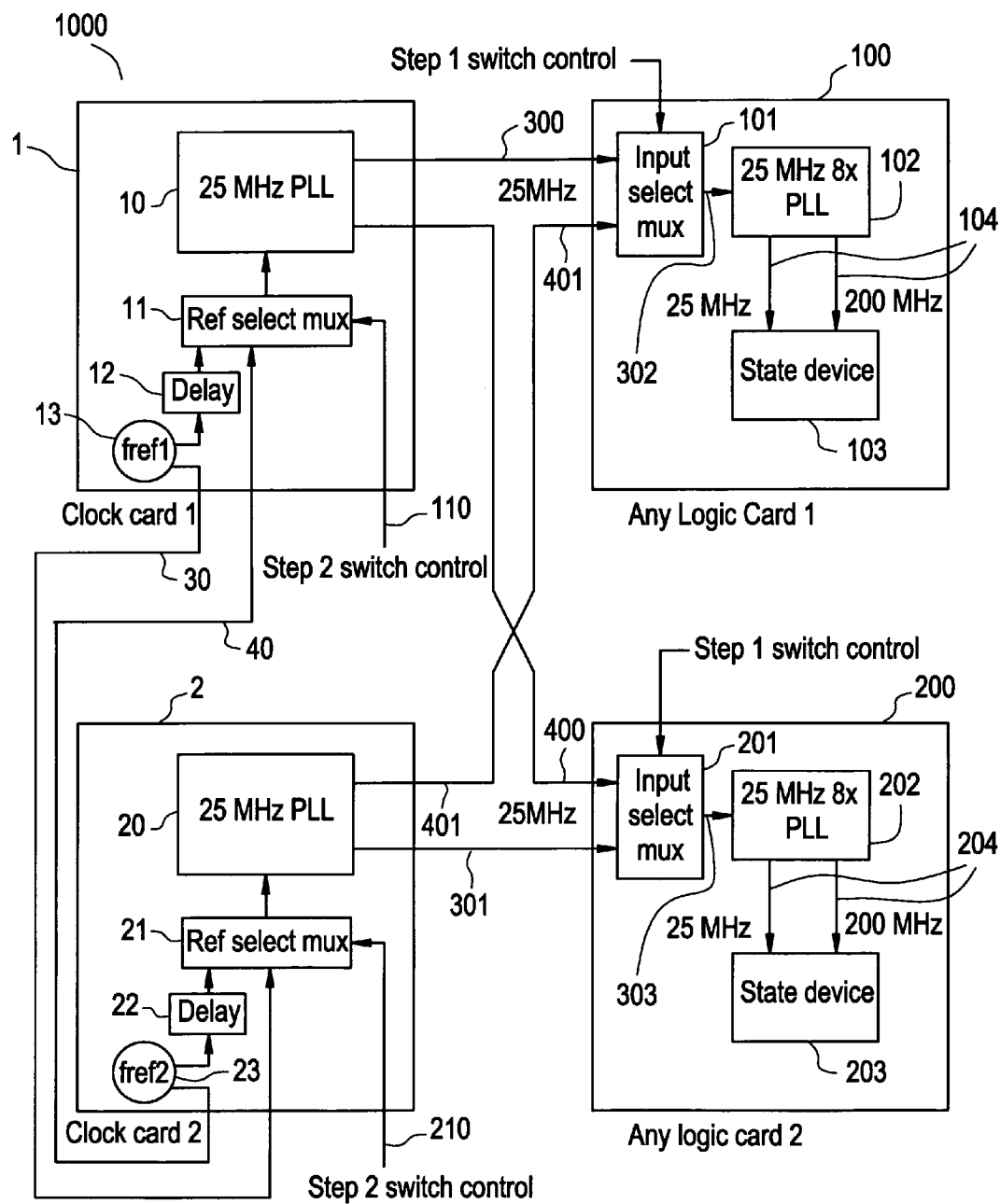
FIG. 1 depicts a simplified block diagram of a technique for providing redundant reference frequencies in a packet switching system according to one embodiment of the present invention.

Referring to FIG. 1 there is shown a synchronous timing circuit 1000 comprising a first-clock circuit 1 and second-clock circuit 2. As envisioned by the present invention, both circuits 1,2 are adapted to generate a reference frequency signal, (hereafter "reference frequency" or "reference signal") where the reference frequencies are at substantially the same frequency and are at substantially the same phase (i.e., "in-phase"). Because each circuit 1, 2 generates substantially the same reference frequency, either can be used by the logic cards 100,200 in order to generate master clock frequency signals which are used by one or more "state" devices 103, 203. The master clock frequencies are generated by logic card phase-lock loops (PLL) 102,202 which are adapted to generate such frequencies using a first-reference signal input via pathway 300,400 or a second reference frequency input via pathway 301,401 depending on the reference frequency selected by a selection unit 101,201 (e.g., a multiplexer).

Either one of the reference frequencies may be used by the logic cards 100,200. To simplify the explanation which follows, it will be assumed that the frequencies 300,400 from first-clock circuit 1 is initially used by the logic cards 100,200 to generate their master clock frequencies. Greatly simplified, the operation of the timing circuit 1000 and logic cards 100, 200 during a failure of the first-clock circuit 1 (or upgrade, or any other action which requires the first-clock circuit 1 to be taken out of service) will now be explained.

Upon detection that the first-clock circuit 1 has failed or is otherwise out of service (e.g., when a signal is not received on pathway 300), the selection unit 101 is adapted to select the second reference frequency input via pathway 401 generated by the second-clock circuit 2. To ensure that the second frequency is at substantially the same frequency and substantially in-phase with the first reference frequency, the second clock circuit 2 is adapted to receive a first oscillator frequency via pathway 30 from a first oscillator 13 residing in the first clock circuit 1. Thus, at any given point in time the second clock circuit 2 is adapted to output the second reference frequency (or oscillation clock signal) via pathway 401 to the first logic card 100 using either the first oscillation frequency (or oscillation clock signal) or using a second oscillation frequency from oscillator 23. It should be understood that though the first and second oscillation frequencies may be substantially identical, this need not be the case. However, at any given point in time both the first and second clock circuits may only use either the first or second oscillation frequency to generate the first or second reference frequencies. Because the first and second clock circuits are so "coupled", in the event either one of the oscillators 13,23 fail both the first and second clock circuits can still generate a reference signal.

Similarly, if one of the PLLs 10,20 of the first or second clock circuits, 1,2 fail or need to be taken out of service the remaining PLL 10 or 20 is available to supply substantially the same reference frequency at substantially the same phase to the logic cards 100,200.

Each of the clock circuits 1,2 comprises a delay section 12,22 to ensure that the two reference frequencies remain in-phase with one another. To avoid confusion, the delay section 12 in the first clock section 1 will be referred to as the "first delay section" while the delay section 22 in the second clock circuit 2 will be referred to as the "second delay section". Each of the delay sections is adapted to add a delay to their respective oscillation frequencies when necessary to keep the first and second oscillation clock signals in-phase with one another. In the event that one of the oscillators 13,23 fails or needs to be taken out of service, the clock signals will remain in-phase with one another as they "move" to the phase of the remaining, working oscillator.

FIG. 1 also depicts first and second oscillator selection sections 11,21 (e.g., multiplexers) each adapted to select either the first or second oscillation frequency based on a control signal sent via paths 110 or 210, respectively. Upon selection of either the first or second oscillation frequency the oscillator selection sections 11,21 are adapted to supply the selected oscillation frequency to the respective PLLs 10,20. Thereafter, each of the PLLs 10,20 are adapted to generate the reference frequencies 300, 400, 301, 401.

It should be noted that while logic cards 100,200 are adapted to receive reference frequencies from both the first and second clock circuits 1,2, the logic cards 100,200 will typically comprise multiplexers 101,201 which are adapted to select only one of the two reference frequencies at a time. As envisioned by the present invention, because both reference frequencies would be substantially at the same frequency and in-phase the synchronous timing circuit 1000 may be referred to as providing redundancy when it comes to the supply of a reference frequency to the logic cards 100,200. This redundancy is critical, because invariably one of the oscillators 13,23 or PLLs 10,20 will fail or need to be taken out of service. When this occurs, the redundancy provided by the circuit 1000 enables the logic cards 100,200 to function as if nothing has happened (i.e., nothing has failed or nothing has been taken out of service). Without this redundancy, the PLLs 102,202 within the logic cards 100,200 cannot generate the master clock frequencies needed to allow the state devices 103,203 to operate effectively. When state devices 103,203 do not operate effectively, information (e.g. packets) received by, or stored by, the state devices 103,203 would be lost (or never received properly).

Before going further, some additional comments are worthy of note. Though FIG. 1 only shows two logic cards 100, 200 it should be understood that any number of logic cards may be adapted to receive the reference frequency signals 300,400,301,401. In addition, though only one state device 103,203 is shown resident within the logic cards 100,200 any number of state devices (e.g., one to seven devices) may be present within each logic card. In one embodiment of the present invention the state devices 103,203 may comprise "data slicers". In another embodiment of the present invention the state devices 103,203 may comprise crossbar "chips". It should be further understood that the term "logic card" is generally used to describe a number of types of cards. For example, as envisioned by the present invention the logic cards may comprise "Q-port" cards or "Xbar" cards.

The first and second clock circuits 1,2 and logic cards 100,200 may be part of, or may themselves comprise, a packet switching system.

In sum, because both the first and second clock circuits 1,2 generate reference signals which are substantially at the same frequency and in-phase, the logic cards 100,200 are constantly supplied with substantially the same reference frequency allowing them to generate master clock frequencies which insures the operation of state devices 103,203 are synchronized. This in turn insures that no packets of information are lost or inadvertently omitted.

Figure 2:
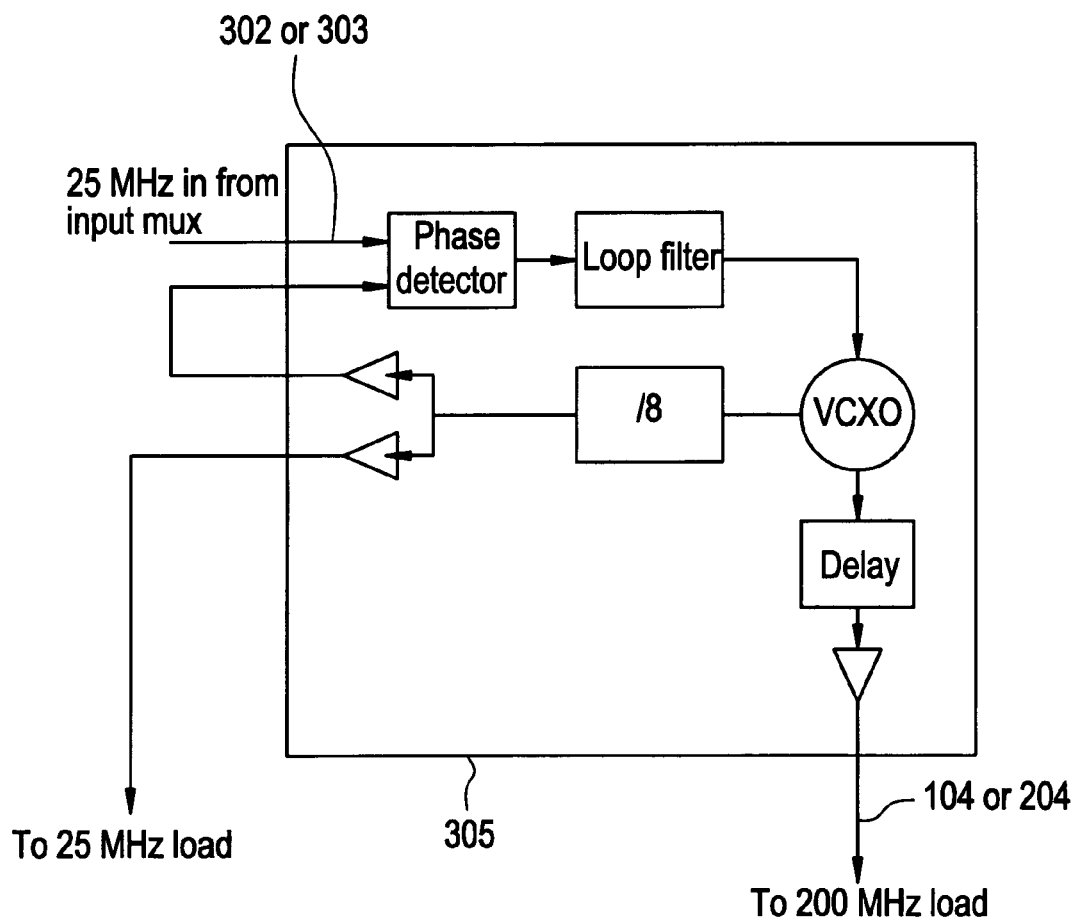
FIG. 2 depicts a simplified block diagram of a technique for insuring that the master clock frequencies used by state devices in a packet switching system is maintained at some fixed relationship to a reference frequency.

FIG. 2 depicts an example of a more detailed block diagram of a PLL. For ease of understanding, only one PLL 305 is shown in FIG. 2. It should be understood that this PLL 305 represents either PLL 102,202 in FIG. 1.

In developing the timing circuit 1000 the present inventors discovered that it was necessary to insure that the master clock signals generated by the PLLs 102,202 remain in a constant phase relationship with the reference signals input via selection units 101,201. Though the synchronous timing circuit 1000 ensures that both reference-signals fed into logic card 100 (or signals fed into card 200) are in-phase with one another, there may come a time when they are out-of-phase with the master clock signals generated by the PLLs 102,202. To protect against this, the present invention envisions a PLL 305 which is adapted to detect the phase differences between a reference signal input via pathway 302 (or 303) and the master clock signals output via pathway 104 or 204. It should be understood that the phase of the reference signal need not be at the same phase as the master clock signal. However, at all times it is important that the frequency of the master clock signal be some integral multiple of the frequency of the reference clock signal (i.e., a "fixed" relationship of some kind).

The reference frequencies/signals and master clock frequencies/signals may comprise any number of frequencies. In one embodiment of the invention, the reference frequencies comprise 25 MHz while the master clock frequencies comprise 200 MHz. In yet another embodiment, the master clock frequencies may comprise 25 MHz (FIG. 2 shows two master clock frequencies; one at 25 MHz and one at 200 MHz).

The discussion above has sought to explain the ideas envisioned by the present invention through the use of some specific examples shown in FIGS. 1 and 2. It should be understood that other embodiments or examples may be envisioned without departing from the spirit and scope of the present invention as defined by the claims that follow.

We claim:

1. A synchronous timing circuit comprising:
   a first clock circuit for generating a reference frequency based on a first oscillation signal or second oscillation signal, the first circuit comprising a first oscillator for generating the first oscillation signal, a first reference frequency selection section for selecting the first or second oscillation signal and a first delay section for adding a first delay to the first oscillation signal when necessary; and
   a second clock circuit for generating substantially the same reference frequency based on the first or second oscillation signal, the second circuit comprising a second oscillator for generating the second oscillation signal, a second reference frequency selection section for selecting the first or second oscillation signal and a second delay section for adding a second delay to the second oscillation signal when necessary.

2. The circuit as in claim 1 wherein the reference frequency comprises 25 MHz.

3. The circuit as in claim 1 further comprising a phase locked loop (PLL) for generating a master clock frequency based on the reference frequency generated by either the first or second clock circuits, and maintaining a fixed relationship between the reference frequency and the master clock frequency.

4. The circuit as in claim 3 wherein the master clock frequency comprises 200 MHz.

5. The circuit as in claim 3 wherein the master clock frequency comprises 25 MHz.

6. The circuit as in claim 1 wherein the circuit comprises a packet switching system.

7. A method for synchronizing the timing of logic cards within a packet switching system comprising:
generating first and second oscillation signals;
detecting whether there has been a failure in the generation of either the first or second oscillation signals;
selecting the first or second oscillation signal which has not failed;
adding a delay to the selected first or second oscillation signal when necessary; and
generating a reference frequency based on the selected first or second oscillation signal.

8. The method as in claim 7 wherein the reference frequency comprises 25 MHz.

9. The method as in claim 7 further comprising:
generating a master clock frequency based on the reference frequency; and
maintaining a fixed relationship between the reference frequency and the master clock frequency.

10. The method as in claim 9 wherein the master clock frequency comprises 200 MHz.

11. The method as in claim 9 wherein the master clock frequency comprises 25 MHz.

* * * * *